Patented Oct. 28, 1952

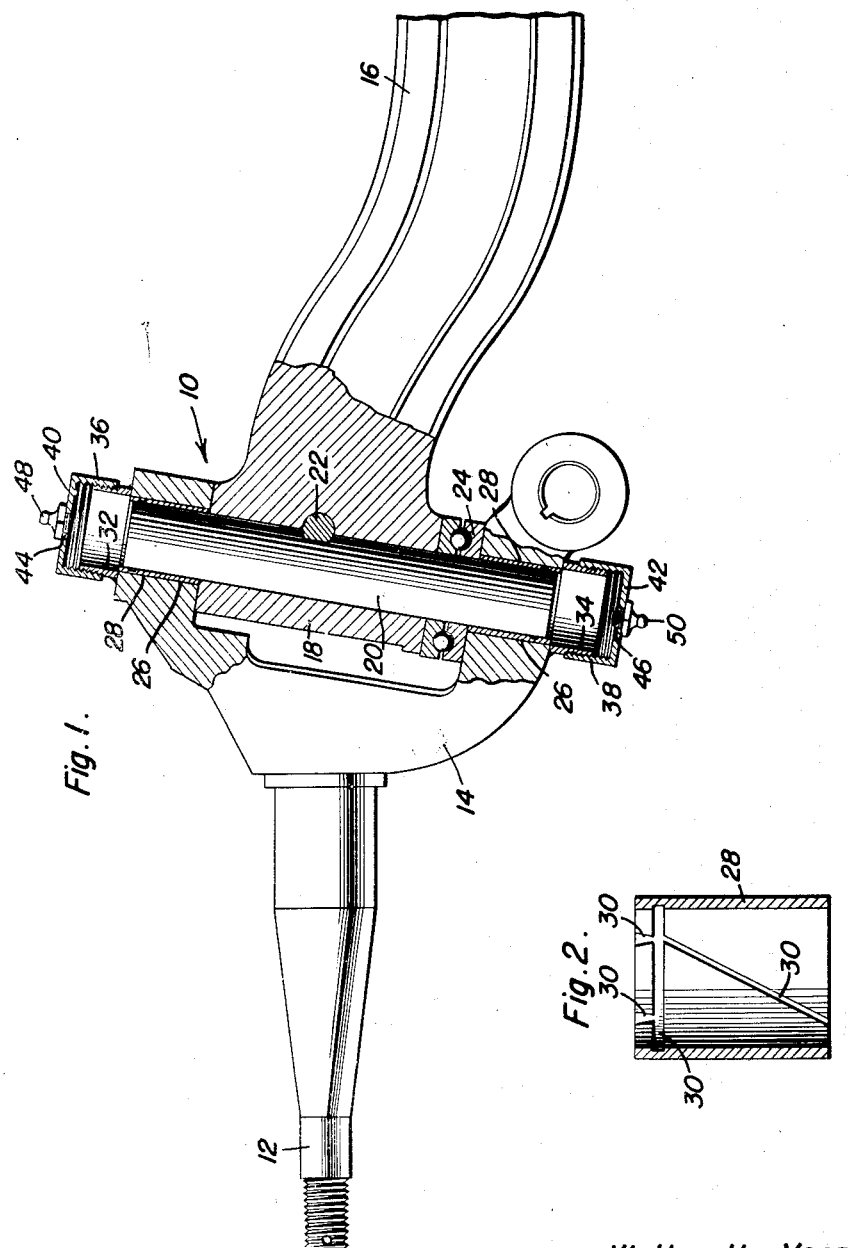

2,615,765

UNITED STATES PATENT OFFICE 2,615,765

KINGPIN LUBRICATION

Walter H. Venable, Augusta, Ga.

Application May 2, 1949, Serial No. 90,927

2 Claims. (Cl. 308—120)

This invention relates to new and useful improvements in kingpin-axle assemblies and the primary object of the present invention is to provide a novel and improved kingpin lubrication system for the continuous lubrication to the movable parts of a kingpin assembly.

Another very important object of the present invention is to provide a kingpin-axle assembly including a means for excluding foreign matter such as dust and grit from the bearing surfaces of such an assembly, thereby reducing the operational wear and prolonging the useful life of the parts.

A further object of the present invention is the provision of a kingpin-axle assembly embodying a lubricating system that will increase the durability of the working parts and assure a constant supply of lubricant to the bearing surfaces of the assembly for a long period of time.

A still further aim of the present invention is to provide a kingpin lubrication system that is small and compact in structure, neat and attractive in appearance, strong and reliable in use, efficient and durable in operation, simple and practical in construction, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of a steering knuckle constructed in accordance with the present invention and with parts thereof broken away for the convenience of explanation; and, Figure 2 is an enlarged longitudinal vertical sectional view of one of the bearing sleeves used in conjunction with the present invention.

Referring now to the drawings in detail, wherein for the purpose of illustration, there is disclosed a preferred embodiment of the present invention, the numeral 10 represents a kingpin-axle assembly generally, including a spindle 12 and yoke 14, an axle 16 having an eye end 18 through which extends a kingpin 20 secured rigidly to the axle by a key or locking pin 22, and a thrust bearing 24 embracing the kingpin 20 and disposed between the lower face of the eye end 18 and the lower portion of the yoke 14.

The yoke 14 is provided with openings 26 in which there is fitted a pair of bearing sleeves 28 that embrace the ends of the kingpin 20. The inner peripheries of the sleeves 28 are provided with internal lubricant receiving grooves 30 whereby the ends of the kingpin will be supplied with a lubricant, such as grease.

Upper and lower tubes 32 and 34, of diameters slightly larger than the outer diameters of the bearing sleeves 28, are fixed by welding or the like to form an integral part of the upper and lower portions of the yoke 14 and the tubes are externally threaded to receivably engage the internally threaded flanges 36 and 38 of upper and lower closure caps or dust caps 40 and 42.

The closure caps 40 and 42 are provided with central internally threaded openings 44 and 46 that receivably engage the threaded shanks of upper and lower grease fittings 48 and 50.

In practical use of the invention, grease, or a suitable lubricant, is forced into the tubes 32 and 34 through the grease fittings 48 and 50 to partially or completely fill the said tubes. The grease will work its way through the grooves or channels 30 in the sleeves 28 to the contacting or bearing surfaces of the sleeves 28 and kingpin 20.

Having described the invention, what is claimed as new is:

1. In a kingpin-axle assembly including a spindle and yoke, an axle, a kingpin securing the axle to the spindle and yoke, and a locking pin securing the kingpin to the axle, said yoke including upper and lower openings; bearing sleeves confined within the openings in the yoke and receiving the ends of the kingpin, tubes welded to said yoke about and exteriorly of said openings and disposed coaxially with the kingpin, said tubes constituting extensions of said sleeves, closure caps mounted on the tubes, and grease fittings secured to the closure caps, said sleeves having internal lubricant receiving grooves, the ends of said kingpin being confined within said sleeves and terminating in said sleeves to permit the entire inner area defined by the tubes to be filled with a lubricant, the internal diameter of said tubes being greater than the external diameter of said sleeves to permit removal of the sleeves through the tubes.

2. In a kingpin-axle assembly including a spindle and yoke, an axle, a kingpin securing the axle to the spindle and yoke, and a locking pin securing the kingpin to the axle, said yoke having openings receiving the ends of said kingpin; the improvement of which comprises a pair of bearing sleeves fitted in and confined within said openings and receiving the ends of said kingpin, said sleeves having internal lubricant receiving grooves, a pair of tubes welded to and projecting outwardly from the yoke and about the openings, dust caps threaded on said tubes, and grease fittings carried by the dust caps, said kingpin having its ends terminating in said sleeves to permit the tubes to be filled with a lubricant without obstruction from the ends of the kingpin, the internal diameter of said tubes being greater than the external diameter of said sleeves to permit removal of the sleeves through the tubes.

WALTER H. VENABLE.

REFERENCES CITED

The following references are of record in the file of this patent:

UNITED STATES PATENTS

| Number | Name | Date |
|---|---|---|
| 1,456,619 | Carlson | May 29, 1923 |
| 1,697,784 | Seaholm | Jan. 1, 1929 |
| 1,946,478 | Bijur | Feb. 13, 1934 |
| 2,076,852 | Leighton | Apr. 13, 1937 |
| 2,094,945 | Hesselrode | Oct. 5, 1937 |